United States Patent
Foti

(10) Patent No.: US 8,818,946 B2
(45) Date of Patent: Aug. 26, 2014

(54) MACHINE TO MACHINE (M2M) APPLICATION SERVER, XDMS SERVER, AND METHODS FOR M2M APPLICATIONS GROUP MANAGEMENT

(75) Inventor: George Foti, Dollard des Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 9 days.

(21) Appl. No.: 13/179,087

(22) Filed: Jul. 8, 2011

(65) Prior Publication Data
US 2013/0013555 A1 Jan. 10, 2013

(51) Int. Cl.
G06F 7/00 (2006.01)
G06F 17/30 (2006.01)

(52) U.S. Cl.
USPC ............................ 707/632; 707/769

(58) Field of Classification Search
USPC .................... 707/769, 632; 709/223
See application file for complete search history.

(56) References Cited

U.S. PATENT DOCUMENTS

| | | | | |
|---|---|---|---|---|
| 2006/0235981 | A1* | 10/2006 | Westman et al. | 709/227 |
| 2008/0008106 | A1* | 1/2008 | Boberg et al. | 370/270 |
| 2009/0193031 | A1* | 7/2009 | Maes | 707/10 |
| 2011/0128911 | A1* | 6/2011 | Shaheen | 370/328 |
| 2011/0268047 | A1* | 11/2011 | Nath et al. | 370/329 |
| 2012/0047551 | A1* | 2/2012 | Pattar et al. | 726/1 |
| 2012/0131168 | A1* | 5/2012 | Foti | 709/223 |
| 2013/0029716 | A1* | 1/2013 | Lee et al. | 455/519 |

OTHER PUBLICATIONS

Wu et al. 'M2M: From mobile to embedded internet'. In IEEE Communications Magazine. vol. 49, Issue 4. Apr. 2011. pp. 36-43.*
ETSI. 'Machine-to-Machine communications (M2M); M2M service requirements'. ETSI TS 102 689 V1.1.1 (Aug. 2010).*
Draft ETSI TR 101 531 V<0.1.3>,Machine-to-Machine communications (M2M); Reuse of Core network functionality by M2M Service Capabilities , Jan. 2011, pp. 01-19.
Draft ETSI TR 101 531 V.0.2.1 Jun. 2011, Machine-to-Machine communications (M2M); Reuse of Core network functionality by M2M Service Capabilities, pp. 1-97.
PCT Search Report from corresponding application PCT/IB2012/053487.

* cited by examiner

Primary Examiner — James E Richardson
(74) Attorney, Agent, or Firm — Alex Nicolaescu; Ericsson Canada Inc.

(57) ABSTRACT

Methods and corresponding Machine-to-Machine Application Server (M2M-AS) and XML Data Management Server (XDMS) are provided for managing groups of M2M applications running on various devices. As groups of M2M applications are formed in a network, the group information comprising identities of the groups and identities of M2M applications belonging to each group is relayed to the M2M-AS. The later further sends such information to the XDMS server for storage. Requests for group membership related to M2M applications can then be handled. When a request for group membership related to an application is received at an M2M gateway or at the M2M-AS, the request is further sent to the XMDS server, which replies back to the requestor with identities of the group(s) that comprise the given M2M application, thus enabling, for example, the requestor to communicate not only with the application, but with entire groups comprising the application.

11 Claims, 3 Drawing Sheets

MACHINE TO MACHINE (M2M) APPLICATION SERVER, XDMS SERVER, AND METHODS FOR M2M APPLICATIONS GROUP MANAGEMENT

FIELD OF THE INVENTION

The present invention relates to the field of machine-to-machine (M2M) communications of connected devices and their related applications, and more particularly to M2M applications group management.

BACKGROUND

The wireless telecommunication industry has gone through various stages of development over the last twenty (20) to thirty (30) years. First, in the first generation of wireless networks, wireless communications were handled via analog-type of wireless transmissions using protocols such as AMPS (Advanced Mobile Phone System) and ANSI-41 (American National Standards Institute-41). In the second generation of wireless networks, the user's voice signal was sampled and carried using digital data signals over the air interface, therefore providing for more reliable and accurate communications while increasing the networks' capacity. In the third and fourth generations of wireless communications, data is added to the digital voice communications and allows the wireless network users to communicate not only voice signals but also to have data access to the Internet and to a wide variety of services associated therewith.

As of today, there are already more wireless subscribers than fixed line subscribers. The growth in wireless communications subscribers has ensured a steady and healthy growth of the wireless industry as the number of worldwide wireless subscribers progressed in just over twenty (20) years from zero (0) to five (5) billions, while the penetration rate of wireless subscriptions is close to one hundred pour cent (100%) in many countries around the globe.

The next wave of growth for wireless telecommunications over the next 10 years will most probably not come from adding regular users to the network, as it has been the case in the past. Rather, after having connected places via the fixed lines, and people via the wireless (mobile) communications, the telecommunications industry is now looking into connecting "things", i.e. for example home appliances, cars, meters, sensors, etc to the Internet, in order to provide an entire new range of services that are appealing to the public and that can sustain the growth of the mobile industry. Therefore, it is the so-called machine-to-machine (M2M) type of communications that will ensure the growth both in the data traffic and in the revenues for the operators of wireless networks, while providing services as never seen before for the users. Houses and home appliances, sensors, and other devices will therefore be wirelessly connected, accessible, and controlled via local networks or the Internet. More particularly, M2M communications also means that an application on a given device can communicate with another application on another device, or on a server, without necessarily involving a human being. It is expected that in ten (10) to twenty (20) years from now, the M2M types of communication will generate a number of connected devices (connected meaning connected to a wireless network and/or the Internet) that is tenfold the number of connected users. For example, a company like TELEFONAKTIEBOLAGET L M ERICSSON (PUBL) forecasts that by year 2020 there will be fifty (50) billions of connected devices worldwide, and that it is the pool of connected devices that will be mostly responsible for the increase in the data traffic over the wireless networks. Examples of connected devices include a pool of electrical counters of a local electrical company that can include millions of electrical counters connected over a wireless interface (such as for example a short range wireless interface) to the local electricity company gateway, which gathers data from all the counters and relays it for example via a 3G wireless connection to the financial database of the electrical company, or a group of connected devices including a series of meteorological sensors or probes that register the wind and the temperature in various locations within a province or a country, and relay the data gathered to the gateway responsible for assembling all this metrological data before providing it to a processing center of the local meteorological company.

It is easily anticipated that many of the networks of connected devices, also referred herein simply as devices, will be significant in size, and will possibly include millions of devices (e.g. a network of electrical counters for the households of the State of California). Therefore, groups of devices will need to be constituted in order to render the communications more efficient. This, in turn, will engender new issues associated with the management of such large groups of devices. Moreover, in some instances the groups of devices and applications running thereon may be visible to the outside Internet world, e.g. when these applications register directly with an M2M application server and can be directly contacted by external parties, while in other instances, those groups of devices and their associated applications will not be visible (non-visible devices) to the outside world ("outside" referring to outside the local network of devices connected to a gateway) when for example such devices and their related applications register with and connect via their corresponding gateway(s), and cannot be contacted directly, but rather only via the gateway. Finally, yet another issue associated with the management of large groups of devices is how an external party (such as for example a subscriber, a network administrator, or another device of a different network) can access and communicate with devices that are member of a certain group. In such a circumstance, it would be useful for the external party to easily contact groups of devices and applications, in order to be able to communicate with all those devices at the same time instead of, for example, having to communicate the same information (e.g. an application update, a configuration, or any other type of message or information that may be common to a multitude of applications running on the M2M devices) to each device individually, which can be cumbersome in terms of data traffic and signalling. However, with the current implementations, where groups are dynamically created, modified, and deleted in various gateways of a wireless network in an ad-hoc fashion it is not possible to know what groups a device is member of since, first, not all the groups are visible to the outside Internet world and second, because there is no standardized way to obtain such information.

Reference is now made to FIG. 1 (Prior Art), which shows a high level network diagram of a current network implementation of an M2M setup. Shown in FIG. 1, are devices 102 and 104 connected via gateways 106 and 108 to an M2M application server (M2M-AS) 110, which is part of a telecommunications network 100 (e.g. a wireless telecommunications network). The devices (interchangeably called "M2M devices" or simply "devices" hereinafter) 102 are typically called non-visible (or private) devices since they are connected via gateways 106 and 108 to the M2M-AS, while devices 104 are typically called visible devices since they are connected directly to the M2M-AS, i.e. without passing through a gateway. The role of the M2M application server 110 is to centralize knowledge about the devices 102 and 104, and to manage resources on behalf of those devices for the purpose of communication between the devices' applications and other parties.

For this purpose, both visible devices and gateways can register with the M2M AS. Applications resident on visible devices 104 register with the device 104 on which they are resident, and the application registration can be further announced to the M2M AS 110. The same applies to applications that are resident on gateways 106 and 108, i.e. they can register with the gateway and be announced further to the M2M-AS.

On the other hand, applications resident on non-visible devices 102 connected to the gateways 106 or 108 register with the gateways and the application registration can be further announced to the M2M AS 110.

The M2M-AS 110 is further connected via core network connections 113 to a core network A 116 and a core network B 118 of the communications network 100, which may both be based on a 3GPP/EPC ($3^{rd}$ Generation Partnership Project/Evolved Packet Core) architecture. A home subscriber server (HSS) 114 may be present in the core network B 118 for providing access to a subscriber database which allows authorizing access to M2M services in case the access network credentials are reused for M2M access as well. The M2M-AS 110 also connects to an XDMS server 120 for the purpose of storing and managing M2M resources. The internal functional blocks of the M2M-AS 110 are also shown within the M2M-AS 110 and include various functionalities as defined by ETSI TS 102 690 which is herein included by reference in its entirety.

With reference to the exemplary scenario shown in FIG. 1, the applications running on the non-visible devices 102 are registered with their respective gateways 106 or 108 and can chose to announce their registration to the M2M AS 110 via their respective gateways when their gateway registers with the M2M AS. On the other side, the applications running on the visible devices 104 register locally with their respective device 104, and can chose to announce their registration to the M2M AS 110 when the device registers with the M2M AS 110. These later applications are fully visible and can be contacted directly by external parties by contacting the device.

Conclusively, there are both great numbers and various types of M2M application and devices in many networks, and therefore contacting each device at a time can be proven inefficient, while contacting groups of devices requires prior knowledge of each group membership and identification in an environment where such information cannot be easily obtained or managed, or is simply inexistent.

Accordingly, it should be readily appreciated that in order to overcome the deficiencies and shortcomings of the existing solutions, it would be advantageous to have a method and system for efficiently enabling communications with groups of devices.

SUMMARY

Methods and corresponding Machine-to-Machine Application Server (M2M-AS) and XML Data Management Server (XDMS) are provided for managing groups of M2M applications running on various devices. As groups of M2M applications are formed in an M2M network, the group information comprising identities of the groups and identities of M2M applications belonging to each group is relayed to the M2M-AS. The later further sends such information to the XDMS server for more persistent storage. IN this manner, requests for group membership related to M2M applications can be efficiently and rapidly handled. When a request for group membership related to an M2M application is received at an M2M gateway or at the M2M-AS, the request is further sent to the XMDS server, which replies back to the requestor with identities of the group(s) that comprise the given M2M application, thus enabling, for example, the requestor to communicate not only with the application, but with entire groups comprising the application.

In one embodiment, the present invention is a method for the management of information related to groups of machine to machine (M2M) applications, the method comprising the steps of obtaining by the M2M-AS information related to a group of M2M applications, the information comprising a group identity and identities of a plurality of M2M applications that belong to the group, and updating by the M2M-AS an XDMS server with the group's identity and with the identities of the plurality of M2M applications that belong to the group.

In another embodiment, the present invention provides a M2M-AS for use in M2M group management, the M2M-AS comprising a communications interface communicating with a network, and a processor operationally connected to the communications interface. The M2M-AS further comprises an instructions repository storing instructions that when executed by the processor cause the later to obtain information related to a group of M2M applications, the information comprising a group identity and identities of a plurality of M2M applications that belong to the group, and to update, via the communications interface, an XDMS server with the group's identity and identities of the plurality of M2M applications that belong to the group.

In another embodiment, the present invention provides a method for the management of information related to groups of M2M applications, the method comprising the steps of receiving at an XDMS server from an M2M-AS an identity of a group of M2M applications and a plurality of identities of M2M applications that belong to the group of M2M applications, and storing in a data repository of the XDMS the identity of the group and the identities of the plurality of M2M applications that belong to the group.

In another embodiment, the present invention provides an XDMS server for use in M2M group management, the XDMS server comprising a data repository storing information related to groups of M2M applications, and a communications interface communicating with a network. The XDMS server further comprises a processor operationally connected to the communications interface and to the data repository, and an instructions repository storing instructions that when executed by the processor cause the later, when the communication interface receives from an M2M-AS an identity of a group of applications and a plurality of identities of M2M applications that belong to the group, to store on the data repository the identity of the group and the identities of the plurality of M2M applications that belong to the group.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

Figure 1:
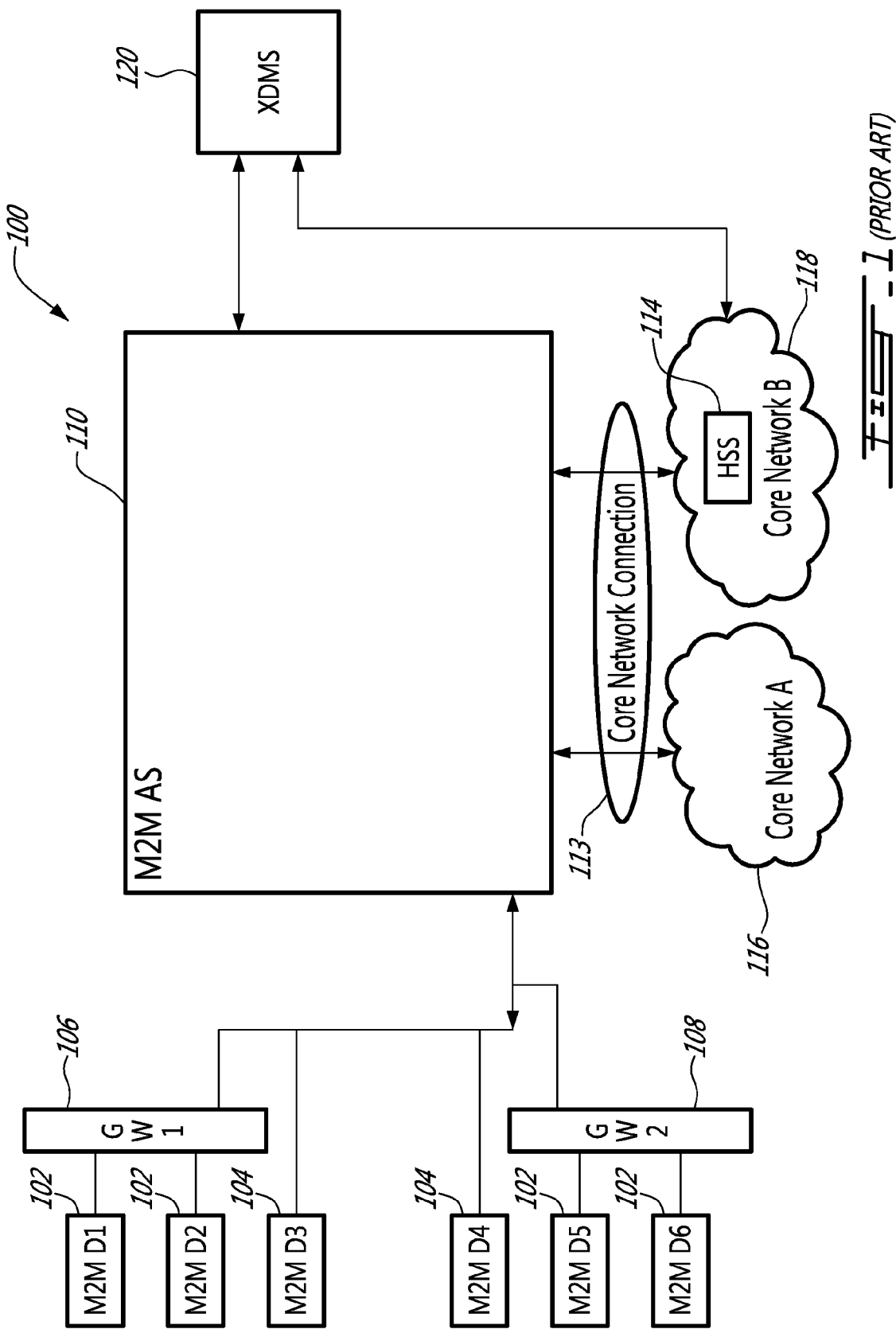
FIG. 1 (Prior Art) is a high level network diagram of a current network implementation of an M2M network set-up.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides for a method, a machine to machine application server (M2M-AS), and an XDMS (XML Data Management Server) server, for easy management of group communications involving devices and their applications, in the context of, for example, M2M communications. In one preferred embodiment, the invention provides for an easy manner of managing a group of devices and their M2M applications, and for handling an external request about which group a certain device, or application running thereon is part of. In some embodiments, the invention provides for an M2M-AS and an XDMS server, provided with information about devices and/or applications running in a network and about M2M group(s) each device and/or application is member of. When a request for group membership is received from any requestor, e.g. from a gateway, an M2M-AS, or any other external party, that request can be forwarded to the XDMS server for determining the group membership of the application concerned by the request. Then, for example, a proper answer can be sent back to the requestor including the group identifier(s) of the group(s) the device application is member of, in order to enable the requestor to efficiently communicate with the group of devices, e.g. by sending a message to the entire group of devices.

In the context of the present description it is to be understood that an M2M application refers to an application (e.g. a software application) that runs on a device, where the application has an identifier (such as for example an URL (Uniform Resource Locator) that uniquely identifies that application and, optionally, the device running the application. A group of applications refers to a group having an identifier (also called herein identity), the group comprising a plurality of applications, which may, for example, share common characteristics.

Figure 2:
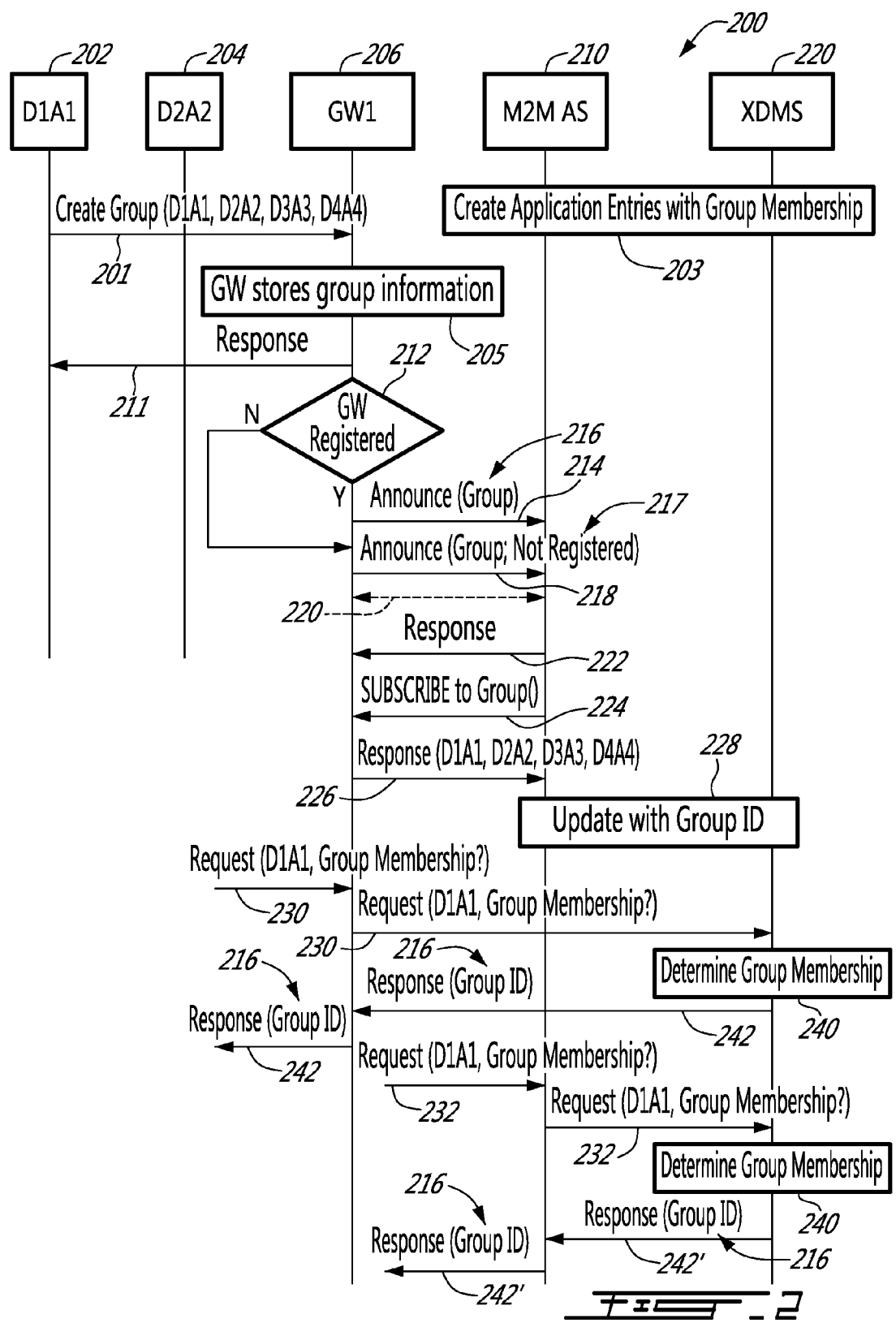
FIG. 2 is a nodal operation and signal flow diagram of an exemplary implementation of a preferred embodiment of the invention related to group communications in-between devices and their related applications and external parties.

References is now made to FIG. 2, which is an exemplary nodal operation and signals flow diagram representative of an exemplary preferred embodiment of the invention implemented in a telecommunications network 200. The exemplary network comprises a first device running first M2M application 202 (also called D1A1) second device running a second M2M application 204 (also called D2A2). The applications 202 and 204 are part of a local network of devices managed by the M2M gateway 206. An M2M-AS 210 is responsible for gathering information about a plurality of M2M gateways and their associated local networks, including the M2M gateway 206, and an XDMS server 220 further functions in the network 200 to store and manage resources related to all devices and applications of the wireless telecommunication network 200, including the applications 202 and 204 (tagged as D1A1 and D1A2 respectively since application 1 runs on device 1 while application 2 runs on device 2). It is understood that each application 202 and 204 has a unique identifier, which may be for example in the form of a URL that may identify either the application itself in a unique manner for the entire network, or to uniquely identify the application in relation with the device on which it is running. The exemplary scenario of FIG. 2 shows the M2M-AS 210 obtaining information related to a group of M2M applications, the information comprising a group identity and identities of a plurality of M2M applications that belong to the group, the M2M-AS 210 further updating the XDMS server 220 with the group's identity and with the identities of the plurality of M2M applications that belong to the group, so that the XDMS server can store such information and provide it to any requestor. The XDMS serve may store such information for many groups and many applications. Thereafter, for example, when a request for a group membership of a given application is received, the M2M-AS or the gateway interrogates the XDMS server for obtaining identities of groups the given application is part of, obtains from the XDMS server the identities of the groups, and respond to the request with the identities of the one or more groups the M2M applications is part of.

In particular, in action 203, every known application of the network 200 is created a record or other data structure saving its application identifier, and optionally any known group the application belongs to. This action may be based on previous M2M applications registrations with the M2M-AS 210 and/or a network administrator's manual input. Further, in action 201, a group of M2M applications is created. This may be achieved, for example, by the application 202 that creates the group of applications in the gateway 206, by sending a create group message, along with a proposed group identifier, and a series of applications identifiers D1A1 through D4A4 of applications that are to be part of the new group (wherein e.g. D4A4 is Application 4 (A4) running on Device 4 (D4)). In action 205, the M2M gateway 206 stores the group information including the group identifier and the applications identifiers, and in action 211 sends back a response to the application 202 for confirming the group creation in the gateway 206. In a variant of the preferred embodiment of the invention, other methods for creating a group of applications may further be contemplated, including, for example, a network administrator who creates a group directly in the gateway 206, via an administrative user interface to the gateway 206. Further in action 212, the gateway 206 may determine if it is registered with an M2M-AS 210 and in the affirmative, it sends a group announcement message 214 including the group identifier 216 in order to announce to the M2M-AS 210 of the creation of the new group. Otherwise, if in action 212 it is concluded that the gateway 206 is not yet registered with the M2M-AS 210 but would still like to make a group announcement to the M2M-AS for the purpose of communicating the group creation to the XDMS, then the gateway 206 sends a group announcement message 218 including the group identifier 216 and an indication 217 that the gateway 206 is not yet registered with the M2M-AS 210. Optionally, action 218 may trigger a sub-registration procedure 220, which allows the gateway 206 to register with the M2M-AS 210. In action 222, having completed the registration process and having been provided with the information about the creation of the new group, the M2M-AS 210 responds back to the gateway 206 to confirm the receipt of the information about the group. In action 224, the M2M-AS 210 subscribes for receiving updates about the group 216, and in action 226, responsive to the subscription, it is provided back with the identities of the applications D1A1 through D4A4 that are member of the new group. In one embodiment, the M2M-AS 210 will continuously refresh the subscription with the gateway 206 for the group 216 as long as the group exists.

Other manners can also be contemplated for providing the M2M-AS 210 with information about a group of applications. In a non-limitative example of variant of the preferred embodiment of the invention, messages 212 through 226 may be replaced with other types of messages. In a first of such an example, the Gateway 206 may use one single message for sending out to the M2M AS 210 the group information, including the group identity and the identities of the applications D1A1 to D4A4. Such message may comprise a modified group announcement message 214 that includes not only the group identity 216 but also the group membership information, i.e. the identities of the applications D1A1 to D4A4. In another example, there is provided a modified response 226 to a SUBSCRIBE message received from the M2M-AS 210, which may include both the group identity 216 and the group membership information.

In action 228, once the M2M-AS 210 is provisioned with the group information, the M2M-AS 210 communicates with the server XDMS 220 in order to provide the later with information about the new group, including identity of the group of M2M applications and a plurality of identities of M2M applications that belong to the group, for allowing the XDMS server 220 to store this information in its data repository.

In a first variant of the preferred embodiment of the invention, action 228 may include a transmission from the M2M-AS 210 to the XDMS server 220 of the group identifier 216 and of the series of application identifiers of applications D1A1 through D4A4 that are part of the new group, and the storage by the XDMS server 220 of the group identifier under a tree or record of each application, so that each application that is part of the group is connected to the group identifier. In another variant of the preferred embodiment of the invention, action 228 may include only the addition of the group identifier information in the record of each application identifier that may have been already present in the XDMS server 220 as created in action 203. In both variants, action 228 results in a data structure to be created or updated in the XDMS 220, where application identifiers of applications that are part of the new group are linked to their corresponding group identifier, such as for example the application D1A1 being linked to the group identifier 216.

One of the purposes of sending group information to the XDMS is, for example, for the XDMS to store such information and be able to answer requests for group membership received from various requestors. Thus, the XDMS server 220 receives a request for a group membership for one of the plurality of M2M application, the request comprising an identity of the one of the plurality of M2M applications. The XDMS server 220 determines the identity of at least one group of applications comprising the one of the plurality of M2M applications based on the identity of the one of the plurality of M2M applications, and responds to the request with the identity of the at least one group of applications that comprises the one of the plurality of M2M applications.

In more particular details, in action 230, it is assumed that a requestor (e.g. a network administrator or other party) desires to communicate with application 202 and with other applications alike it, and for that purpose desires to know the group membership of application 202, i.e. the group(s) the application 202 belongs to. For this purpose, the requestor issues a request for the group membership of the application D1A1 202, which is received at the M2M gateway 206. The request 230 may comprise the identity of the application D1A1 202 and an interrogation of the group membership of the application, i.e. a request for all the groups the application D1A1 is part of. The request 230 is forwarded from the M2M gateway 206 to the XDMS server 220 (possibly and optionally via the M2M-AS 210) and in action 240, the XDMS server 220 determines the group membership of the application D1A1 by interrogating its local data structure that stores the group membership information. In so doing, in action 240, the XDMS 220 determines that the application D1A1 is member of the group identified by the group identifier 216, and in action 244 it responds back to the M2M gateway 206 with the group identifier 216 so that M2M gateway 206 can further answer back to the request 230. If application 202 is part of multiple groups, then the identity of each such group is returned.

A similar request may also be received by the M2M-AS 220 without involvement of the M2M gateway 206, such as for example as shown in action 232, in which case the request 232 is analogously relayed to the XDMS server 220 so that the same action 240 is performed for determining the group membership of the application D1A1, and for a similar response 242' to be sent back to M2M-AS 210 with the group identifier 216. From there, the M2M-AS can further reply back to the requestor with the group membership information.

While the scenario illustrated in FIG. 2 is only exemplary in nature, it will be understood that many M2M groups of applications can be created in a similar manner, using a plurality of gateways alike the M2M gateway 206 and/or a plurality of M2M-AS-es alike the M2M-AS 210. For example, gateways for M2M applications may need to form various groups of M2M applications executing on the devices connected to the gateway for the purpose of software update or collective communication with groups of applications to report a reading (such as for example in the context of smart meters or water meters), or for configuration management purposes. This allows network applications, servers, and other parties connected to M2M-AS-es to query the M2M-AS about group membership so that it can target the correct group for the intended application resident on a device connected to a gateway. In one embodiment, for example, if an application is not a member of any group and it must be contacted for a given purpose by an M2M application, then the target application must either join the correct group so that the M2M application can just address the group or the M2M application will be forced to address the group and the applications that are not members in the group.

As it can be contemplated from the exemplary preferred embodiment shown in FIG. 2, there is provided a method for creating a group of M2M applications, storing group information, and announcing the group creation information to an M2M-AS which than relays the information to an XDMS server 220 for persistent storage therein. Such group information may be received at the XDMS server 220 from a plurality of M2M gateways alike the M2M gateway 206, or a plurality of M2M devices not connected to gateways so that the XDMS server ends up in storing and making accessible group information related to many, if not all, of the M2M applications of the network 200. This results in a new service architecture, where for example external requests for group membership information directed to any one of the M2M applications connected through any one of the M2M gateways and/or M2M-AS-es of a network alike the network 220 is stored and made readily accessible from an XDMS server.

Figure 3:
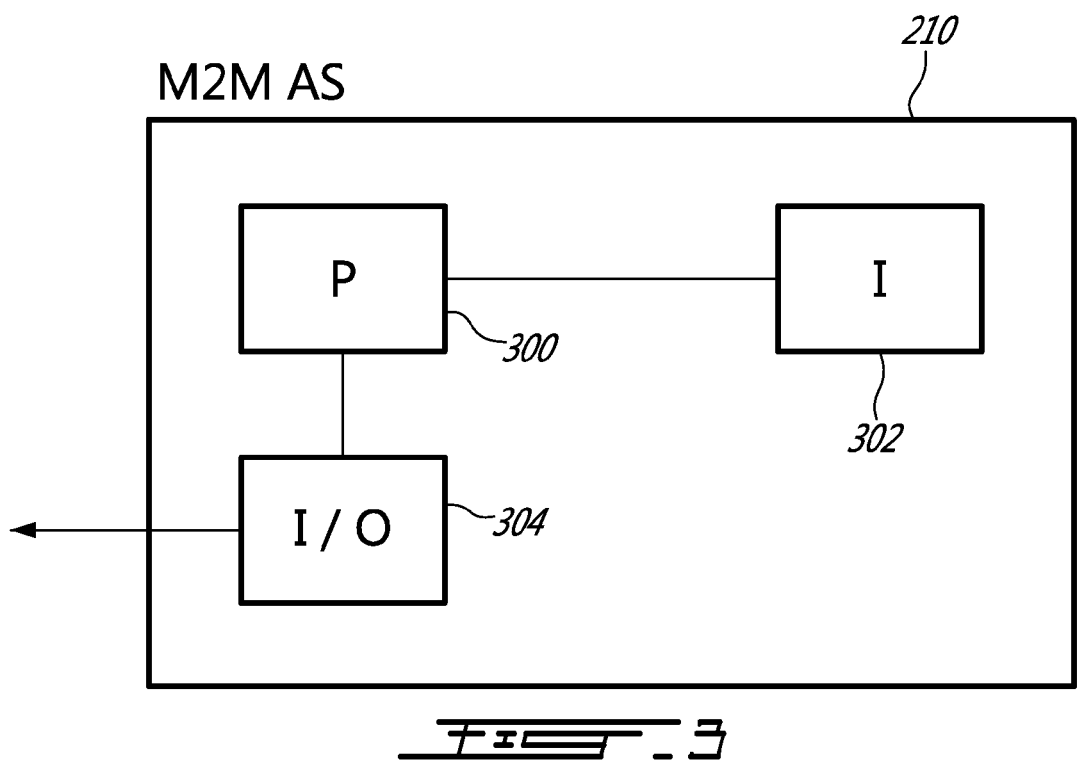
FIG. 3 is a high level block diagram of an exemplary M2M-AS according to a preferred embodiment of the invention.

Reference is now made to FIG. 3, which shows an exemplary high level block diagram of the M2M-AS 210. The M2M-AS 210 has a communications (input/output) interface 304 for handling communications with external parties and nodes as previously described in relation to FIG. 2. The communications interface 304 is operationally connected to a processor 300, which in turn is operationally connected via proper internal interfaces to an instructions repository 302. The later includes instructions, that when transmitted to and executed by the processor 300 cause the later to perform the actions shown in FIG. 2 in relation to the M2M-AS 210. For example, when such instructions are executed on the processor 300, they cause the processor to send, process, or receive messages, alone or in combination with the communications interface 304, as described in actions 222, 224, 228, 230, and/or 232 of FIG. 2. In more particular, the instructions repository stores at least instructions that when executed by the processor cause the later to obtain information related to the group of M2M applications, the information comprising a group identity and identities of a plurality of M2M applications that belong to the group, and to update, via the communications interface, the XDMS server 220 with the group's identity and identities of the plurality of M2M applications that belong to the group. The instructions repository may comprise further instructions, that when executed by the processor cause the later, when receiving a request for a group membership for one of the plurality of M2M applications, to interrogate, via the communications interface, the XDMS server for obtaining one or more identities of groups the one of the plurality of M2M applications is part of and to obtain from the XDMS server the one or more identities of groups the one of the plurality of M2M applications is part of, and further to respond to the request with the one or more group identities.

Figure 4:
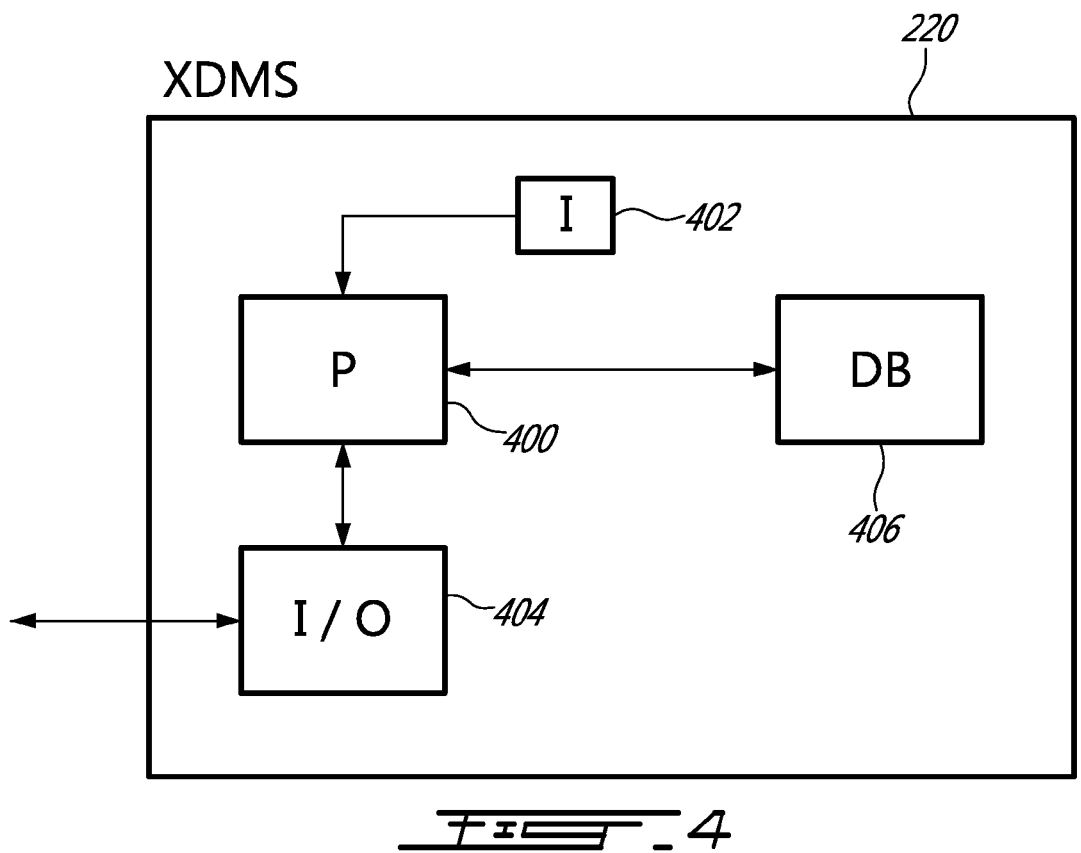
FIG. 4 is a high level block diagram of an exemplary XDMS server according to a preferred embodiment of the invention.

Reference is now made to FIG. 4, which shows an exemplary block diagram of the XDMS server 220. The XDMS server is provided with an M2M applications management database 406 that stores M2M application information comprising group information including the group identifiers and all the M2M applications that are members of each M2M group. The XDMS server 220 is further provided with a communication input/output interface 404 responsible for communications with the network 200 and its other components. The XDMS server 220 further includes a processor 400 and an instruction repository 402 storing instructions that when executed by the processor 400 cause the later to perform, alone or in combination with the communication interface 404, the actions related to the XDMS server 220 as shown in FIG. 2. For example, when such instructions are executed by the processor 400, they cause the processor to perform action 203 (or at least the part of action 203 related to the XDMS server 220) for creating a record for known M2M applications of the network 200, the action 228 where M2M application records are updated with group information, and the action 240 where the group membership of a given M2M application is retrieved from the database 406, or the creation of the responses 242 and 244 and their transmission via communications interface 404. In particular, the instructions repository 402 may store at least instructions that when executed by the processor 400 cause the later, when the communication interface 404 receives from an M2M application server (M2M-AS) 210 an identity of a group of applications and a plurality of identities of M2M applications that belong to the group, to store on the data repository 406 the identity of the group and the identities of the plurality of M2M applications that belong to the group. The instructions repository 402 may further store instructions, that when executed by the processor 400 cause the later, when the communications interface 404 receives a request for a group membership for one of the plurality of M2M applications, to retrieve from the data repository 406 the identity of at least one group of applications comprising the one of the plurality of M2M applications using the identity of the one of the plurality of M2M applications, and to respond via the communications interface 404 to the request with the identity of the at least one group of applications comprising the one of the plurality of M2M applications As it can be contemplated, the present invention provides various embodiments that allow an external party to easily request and obtain group membership information of various M2M applications of a network. This provides an extremely valuable capability to requestors such as for example the network administrators, other M2M applications, or other subscribers, for determining the group membership of a given application and then using that information for sending group communications, such as for example one-to-many messages or software updates. Provided with the group information, parties can use the group identifier in order to then communicate with a plurality of applications at a time, often times with a significant number of applications at the same time, thus reducing the signaling associated with, for example, the update of some applications. Uses of such a setup may include the software updates of entire groups of M2M applications, the update with new functional parameters of large groups of M2M applications, etc.

Based upon the foregoing, it should now be apparent to those of ordinary skills in the art that embodiments of the present invention provide an advantageous solution, which offers easy and efficient propagation, storage, and retrieval of M2M group information related to groups of M2M applications. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth herein below.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A method for the management of information related to groups of machine to machine (M2M) applications, the method comprising the steps of:
   obtaining by the M2M Application Server (M2M-AS) information related to a group of M2M applications, the information comprising a group identity and identities of a plurality of M2M applications that belong to the group;
   updating by the M2M-AS an XML Data Management Server (XDMS) server with the group's identity and with the identities of the plurality of M2M applications that belong to the group
   receiving from a requestor a request at the M2M-AS for a group membership of one of the plurality of M2M applications, the one M2M application being other than the requestor, and the request comprising an identify of the one of the plurality of M2M applications;

interrogating the XDMS server for obtaining one or more identities of groups the one of the plurality of M2M applications is part of, using the identity of the one of the plurality of M2M applications;

obtaining from the XDMS server the one or more identities of groups the one of the plurality of M2M applications is part of; and sending from the M2M-AS to the requestor, which is different than the one M2M application, the one or more identities of groups the one of the plurality of M2M applications is part of.

2. The method of claim 1, wherein the step of obtaining information related to a group of M2M applications comprises the steps of:

receiving a group announcement from an M2M gateway comprising the group identity;

subscribing to obtain the identities of a plurality of M2M applications that belong to the group; and obtaining the identities of a plurality of M2M applications that belong to the group.

3. The method of claim 1, further comprising, before the step of obtaining the information related to a group of M2M applications, the step of:

obtaining identities of M2M applications of a network; and triggering the XDMS server to create entries in the XDMS server for each one of the obtained identities of M2M applications of the network.

4. A machine to machine application server (M2M-AS) for use in M2M group management, the M2M-AS comprising:

a communications interface communicating with a network;

a processor operationally connected to the communications interface; and an instructions repository storing instructions that when executed by the processor cause the later to obtain information related to a group of M2M applications, the information comprising a group identity and identities of a plurality of M2M applications that belong to the group, and to update, via the communications interface, an XML Data Management Server (XDMS) server with the group's identity and identities of the plurality of M2M applications that belong to the group, the instructions repository further including instructions, that when executed by the processor cause the later, when receiving a request from a requestor for a group membership for one of the plurality of M2M applications, the one M2M application being other than the requestor, and the request comprising an identify of the one of the plurality of M2M applications, to interrogate, via the communications interface and using the identity of the one of the plurality of M2M applications, the XDMS server for obtaining one or more identities of groups the one of the plurality of M2M applications is part of and to obtain from the XDMS server the one or more identities of groups the one of the plurality of M2M applications is part of, and further to send to the requestor, which is different than the one M2M application, the one or more group identities.

5. The M2M-AS of claim 4, wherein for obtaining information related to a group of M2M applications, the instructions repository comprise further instructions that when executed by the processor cause the later, when the communication interface receives from an M2M gateway a group announcement comprising the group identity, to instruct the communication interface to subscribe for obtaining the identities of a plurality of M2M applications that belong to the group, wherein responsive to the subscribing, the M2M-AS receives the identities of a plurality of M2M applications that belong to the group.

6. The M2M-AS of claim 5, wherein the announcement includes an indication that the M2M gateway is not registered with the M2M-AS, which triggers a registration of the M2M gateway with the M2M-AS.

7. The M2M-AS of claim 4, wherein the M2M-AS obtains identities of M2M applications of a network and signals the XDMS server for creating entries in the XDMS server for each one of the obtained identities of M2M applications of the network before obtaining information related to the group of M2M applications.

8. A method for the management of information related to groups of machine to machine (M2M) applications, the method comprising the steps of:

receiving at an XDMS (XML Data Management Server) server from an M2M application server (M2M-AS) an identity of a group of M2M applications and a plurality of identities of M2M applications that belong to the group of M2M applications; and storing in a data repository of the XDMS the identity of the group and the identities of the plurality of M2M applications that belong to the group;

receiving a request issued by a requestor for a group membership for one of the plurality of M2M applications, the one M2M application being other than the requestor, and the request comprising an identity of the one of the plurality of M2M applications;

determining the identity of at least one group of applications comprising the one of the plurality of M2M applications based on the identity of the one of the plurality of M2M applications;

responding to the request with the identity of the at least one group of applications that comprises the one of the plurality of M2M applications.

9. The method of claim 8, further comprising before the step of receiving, the steps of:

obtaining identities of M2M applications of a network; and creating entries for each one of the obtained identities of M2M applications of the network.

10. An XDMS (XML Data Management Server) server for use in M2M group management, the XDMS server comprising:

a data repository for storing information related to groups of M2M applications;

a communications interface communicating with a network;

a processor operationally connected to the communications interface and to the data repository; and an instructions repository storing instructions that when executed by the processor cause the later, when the communication interface receives from an M2M application server (M2M-AS) an identity of a group of applications and a plurality of identities of M2M applications that belong to the group, to store on the data repository the identity of the group and the identities of the plurality of M2M applications that belong to the group, the instructions repository including further instructions, that when executed by the processor cause the later, when the communications interface receives a request originated by a requestor, the one M2M application being other than the requestor, for a group membership of one of the plurality of M2M applications, to retrieve from the data repository the identity of at least one group of applications comprising the one of the plurality of M2M applications using the identity of the one of the plurality of M2M applications, and to respond via the communications interface to the request with the identity of the at least one group of applications comprising the one of the plurality of M2M applications.

11. The XDMS server of claim 10, wherein the instructions repository further includes instructions, that when executed by the processor cause the later, when the communications interface receives identities of M2M applications of a network to create in the data repository entries for each one of the received identities of M2M applications of the network.

* * * * *